United States Patent [19]

van der Lely

[11] 4,187,915

[45] Feb. 12, 1980

[54] SOIL CULTIVATING IMPLEMENTS

[76] Inventor: Cornelis van der Lely, 7, Brüschenrain, Zug, Switzerland

[21] Appl. No.: 864,471

[22] Filed: Dec. 27, 1977

[30] Foreign Application Priority Data

Dec. 29, 1976 [NL] Netherlands ............... 7614518

[51] Int. Cl.² ........................................... A01B 33/06
[52] U.S. Cl. ..................................... 172/59; 172/61; 74/143
[58] Field of Search ................. 172/61, 59, 125, 111; 74/143

[56] References Cited

U.S. PATENT DOCUMENTS

| | | | |
|---|---|---|---|
| 1,407,647 | 2/1922 | Elledge | 172/125 X |
| 2,713,816 | 7/1955 | Berg | 172/61 |
| 3,949,813 | 4/1976 | Lely | 172/59 |
| 3,962,925 | 6/1976 | Olson | 74/143 |
| 3,985,184 | 10/1976 | Lely | 172/59 |

FOREIGN PATENT DOCUMENTS 512494  7/1952  Belgium ............................. 172/61

*Primary Examiner*—Richard J. Johnson
*Attorney, Agent, or Firm*—Mason, Mason and Albright

[57] ABSTRACT

An implement mounts a row of rotatable members, having resilient tines, that are rotatable about upwardly extending shafts. The members are driven to rotate intermittently by eccentric mechanisms that reciprocate connectors back and forth, the connectors being coupled to pawls that engage ratchet wheels on the shafts. Non-return pawls prevent the shafts from turning in reverse direction. Preferably, there are at least four tined members mounted in a row on an elongated hollow frame portion and the input shaft mounts two eccentric mechanisms that are located centrally of the frame portion, each mechanism being connected to operate two of the tined members, out-of-phase, so that neighboring members are turned periodically in relative opposite directions. The frame portion is pivoted to a forward coupling member at several points, one of which is a shear pin that allows the frame portion to tilt upon overload of a tined member. Soil is progressively loosened by the intermittent driving operation of the tines and smearing of the soil avoided.

17 Claims, 7 Drawing Figures

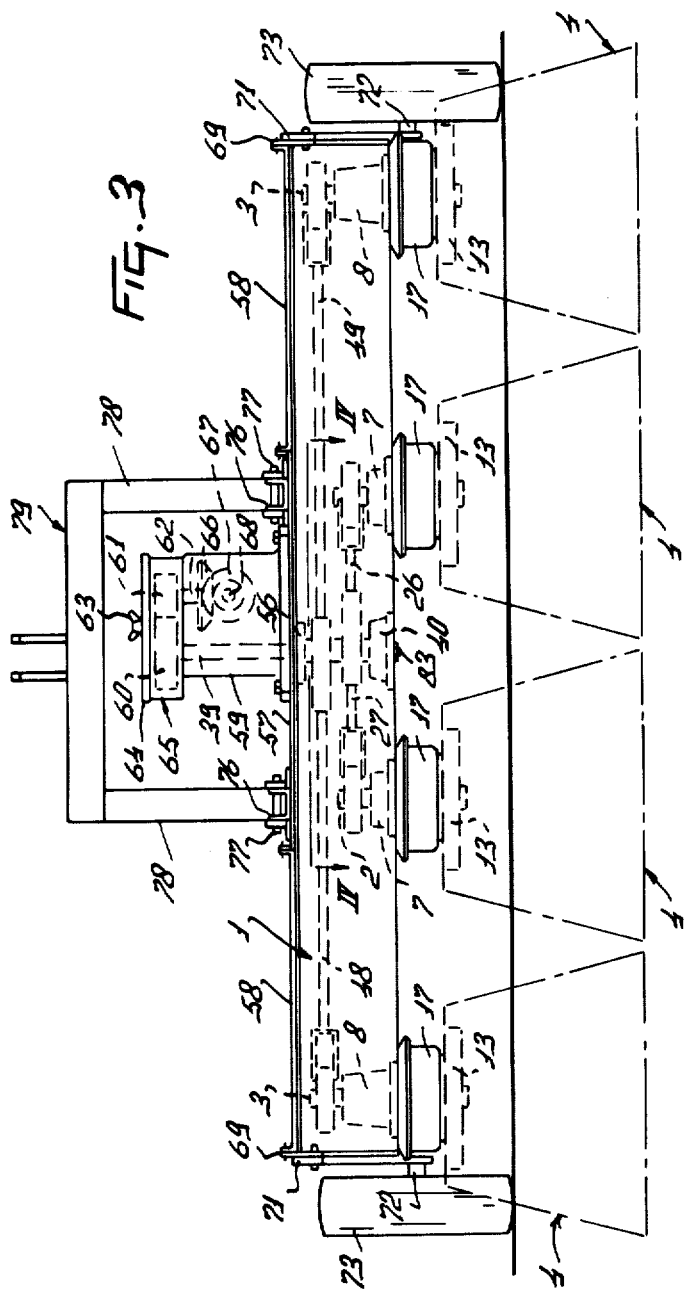

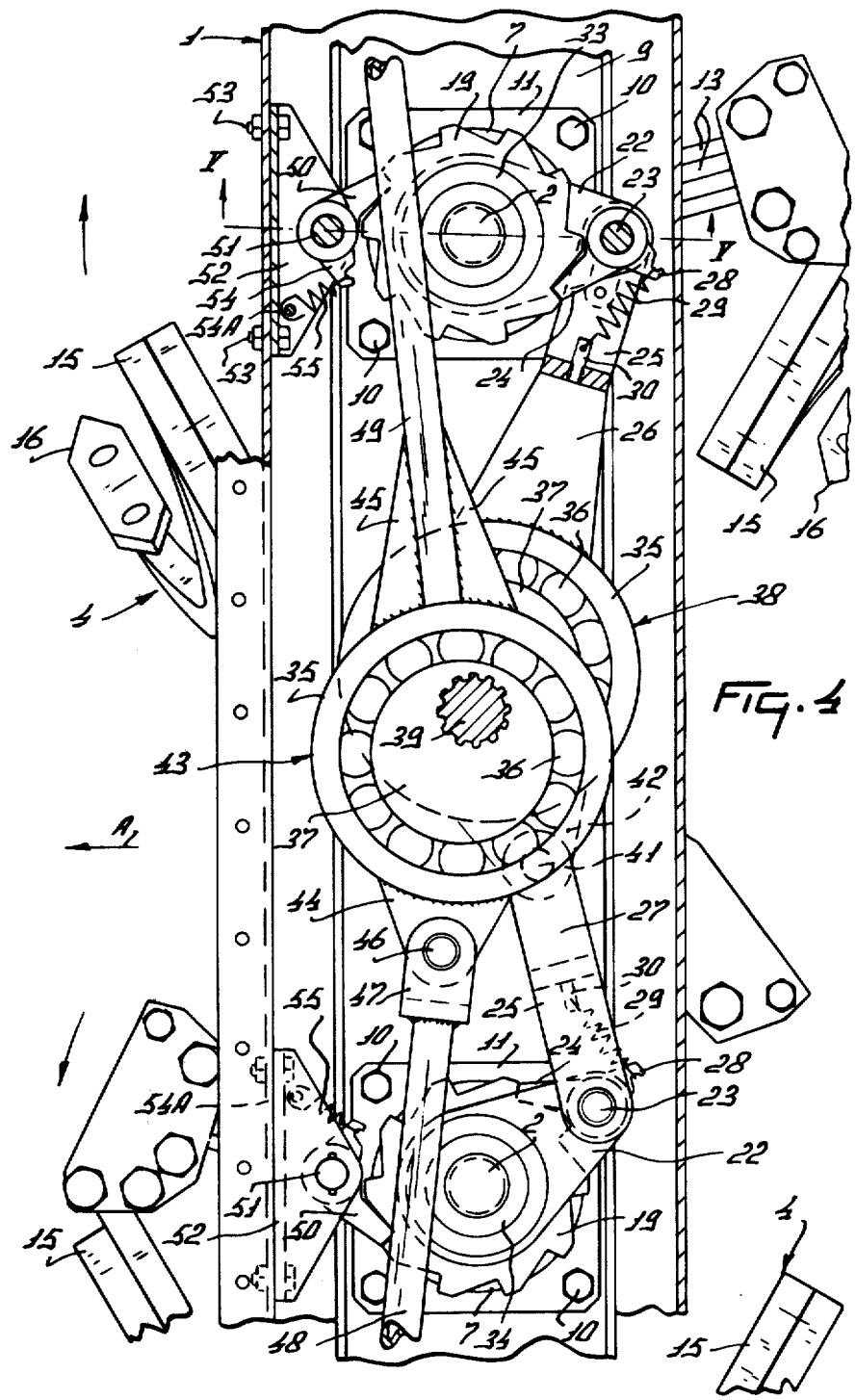

1

SOIL CULTIVATING IMPLEMENTS

According to one aspect of the invention, there is provided a soil working implement of the kind set forth, wherein the soil working members are arranged to be intermittently rotated, during the use of the implement.

Figure 1:
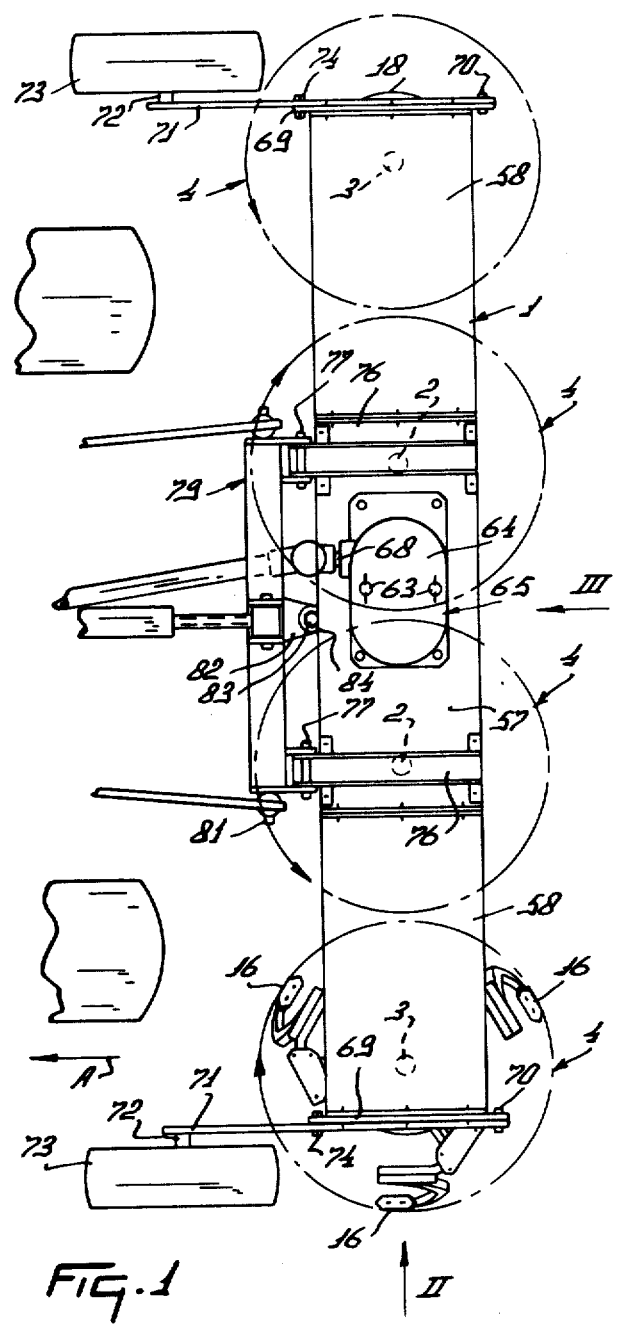
Figure 2:
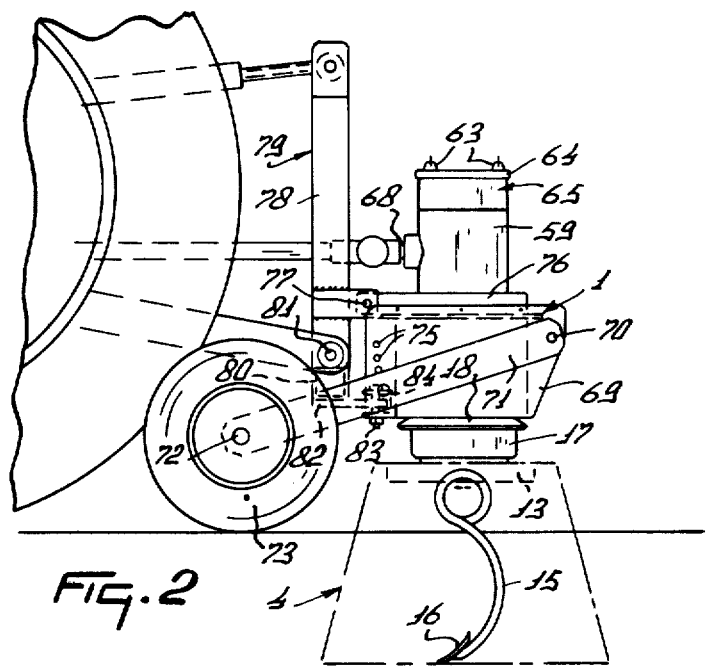
Figure 5:
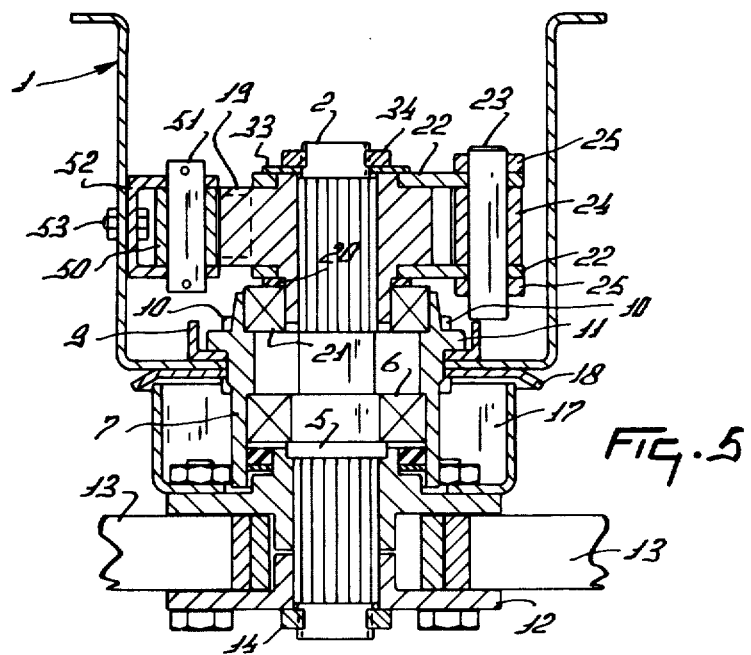
Figure 6:
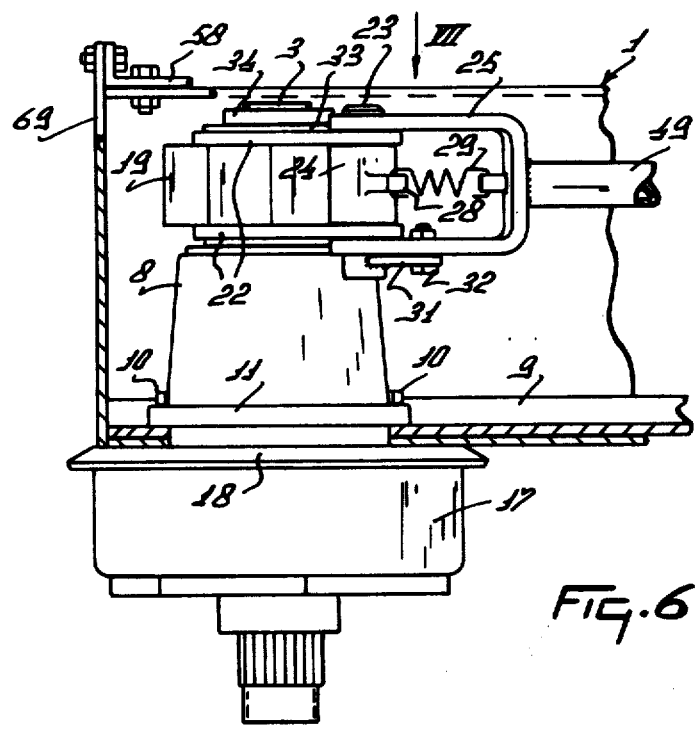
Figure 7:
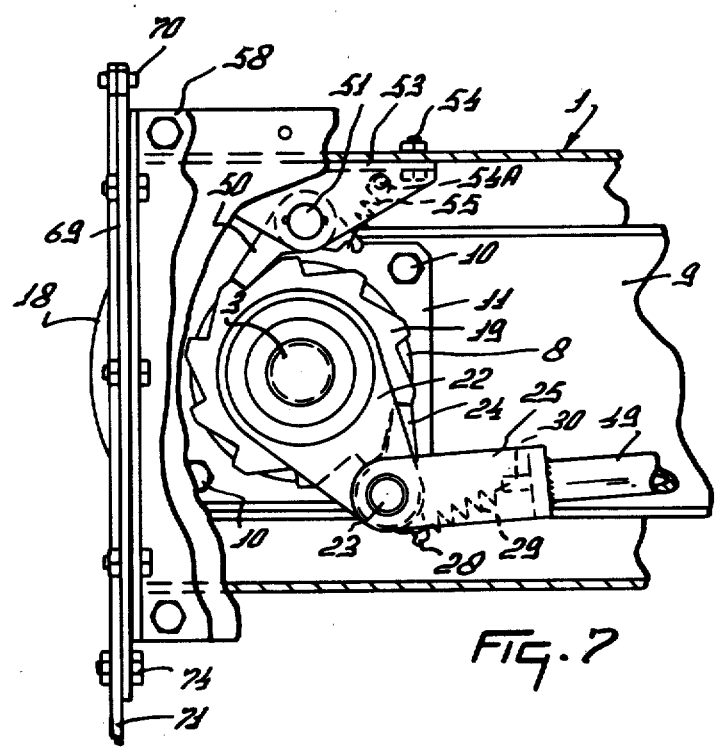

For a better understanding of the invention, and to show how the same may be carried into effect, reference will now be made, by way of example, to the accompanying drawings, in which:

FIG. 1 is a plan view of a soil cultivating implement in accordance with the invention connected to the rear of an agricultural tractor, FIG. 2 is a side elevation as seen in the direction indicated by an arrow II in FIG. 1, FIG. 3 is a rear elevation as seen in the direction indicated by an arrow III in FIG. 1, FIG. 4 is a section, to an enlarged scale, taken on the line IV—IV in FIG. 3, FIG. 5 is a section taken on the line V—V in FIG. 4, FIG. 6 is a part-sectional rear elevation, to the same scale as FIGS. 4 and 5, illustrating details of part of a drive transmission to one of a number of soil working members of the implement, and FIG. 7 is a view as seen in the direction indicated by an arrow VII in FIG. 6.

Referring to the drawings, the soil cultivating implement that is illustrated therein is particularly suitable for the deep cultivation of soil and comprises a hollow box-section frame portion 1 that extends substantially horizontally transverse, and usually (as illustrated) substantially perpendicular to the intended direction of operative travel of the implement which is indicated by an arrow A in FIGS. 1 and 4 of the drawings. Four substantially vertical, or at least upwardly extending, shafts 2 and 3 are rotatably mounted in the hollow frame portion 1, in a manner that will be further discussed below, said shafts 2 and 3 being arranged in a single row with their longitudinal axes (axes of rotation) spaced apart from one another by distances of substantially 75 centimeters. Each of the shafts 2 and 3 projects downwardly from beneath the bottom of the hollow frame portion 1, the downwardly projecting portion thereof being provided with a corresponding soil working member 4. The shafts 2 are of shorter axial length than are the shafts 3, the shafts 2 being the inner pair of shafts of the row of four such shafts while the shafts 3 are the shafts at the opposite ends of said row (see FIG. 3). Each of the shafts 2 and 3 is provided, at a location which is beneath the midpoint of its upright length, with an enlarged diameter shoulder 5 (FIG. 5), a corresponding roller bearing 6 whose inner race surrounds the shaft 2 or 3 concerned immediately above said shoulder 5 having that inner race in abutting engagement with the shoulder. The roller bearings 6 that correspond to the shafts 2 have their outer races surrounded by corresponding bearing housings 7 whilst the bearings 6 that correspond to the shafts 3 have their outer races surrounded by housings 8. Each of the housings 7 and 8 is entered downwardly through a corresponding hole in the flat bottom of the hollow frame portion 1 and through a hole in a strengthening plate 9 that is of channel-shaped cross-section these parts being releasably clamped to one another by bolts 10 that are entered through substantially square fastening flanges 11 of the housings 7 and 8 (see FIG. 4). The strengthening plate 9 extends throughout substantially the whole of the transverse length of the hollow frame portion 1 and is arranged so that its upright limbs lie close to the front and rear edges of each fastening flange 11. The lower ends of the bearing housings 7 and 8 project downwardly beyond the corresponding roller bearings 6 and shoulders 5 so that recesses are formed which receive upper end portions of the upper parts of corresponding two-part hubs 12 of carriers or supports 13 for the respective soil working members 4. It can be seen in FIG. 5 of the drawings that the upper end portions of the upper parts of the hubs 12 are stepped and co-operate with the surrounding non-rotary housings 7 or 8 by way of diagrammatically illustrated lubricant seals. The two parts of each hub 12 are internally splined to co-operate with a lower splined portion of the corresponding shaft 2 or 3 that extends beneath the shoulder 5 of that shaft. Each hub part has a flange and said flanges are clamped to one another, around other parts of the corresponding carriers or supports 13, by bolts that can be seen in FIG. 5 of the drawings. Each hub 12 is prevented from becoming detached from the lower splined portion of the corresponding shaft 2 or 3 by the provision of a short lowermost screwthreaded end part of said shaft that co-operates with a fastening nut 14. The fastening nuts 14 preferably include inserts which are designed to prevent said nuts from working loose when the implement is in use.

The carrier or support 13 of each soil working member 4 comprises three arms which extend substantially radially outwards with respect to the longitudinal axis of the corresponding shaft 2 or 3 at substantially 120° intervals around that axis. Each arm is of resilient construction being in the form of a plurality, such as four, of interengaging spring steel strips (see FIG. 4). Each arm of each carrier or support 13 is provided, at its radially outermost end, with a corresponding spring steel or other resilient tine 15, each tine 15 comprising a fastening portion that is clampingly connected to the corresponding arm, a helical coil and a substantially C-shaped soil working portion whose concave side is foremost with respect to the intended direction of operative rotation of the member 4 concerned so that the lower end of said soil working portion is orientated downwardly and forwardly with respect to said direction whilst the upper end thereof is initially orientated downwardly and rearwardly with respect to said direction from its junction with the corresponding helical coil. The lower end of the substantially regularly curved soil working portion of each tine 15 is replaceably provided with a corresponding reversible pointed blade 16.

The flange of the upper part of each two-part hub 12 has an inwardly directed rim at the bottom of a corresponding cylindrical hood 17 releasably secured to it by the same bolts as clamp the upper and lower parts of the hub 12 concerned to one another. Each hood 17 coaxially surrounds the corresponding shaft 2 or 3 and bearing housing 7 or 8 and has its upper edge disposed immediately beneath an outer upwardly tapering frusto-conical rim of a corresponding ring 18 that is clampingly fastened to the lower surface of the bottom of the hollow frame portion 1 by the same bolts 10 that are employed to fasten the bearing housings 7 and 8 in their appointed positions. The rotary hoods 17 and non-rotary rings 18 afford elements which co-operate in protecting the roller bearings 6 and fastenings of the carriers or supports 13 from contamination and damage. Upper end portions of the outer and shorter shafts 2 are axially splined and receive the matchingly splined hubs of corresponding ratchet wheels 19. A lower end portion of the hub of each ratchet wheel 19 is stepped and the step of smallest diameter is surrounded by the inner race of a corresponding upper roller bearing 21. The outer race of each bearing 21 is surrounded by the upper end of the corresponding bearing housing 7 and the upper end of the inner race thereof abuts against a spacing ring 20 which surrounds the hub of the ratchet wheel 19 concerned between that race and the next step of said hub which next step has a little larger diameter. Arms 22 are mounted in a freely turnable manner around the last mentioned step of each ratchet wheel hub 19 and around a step of the same diameter at the upper end of that hub. The upper and lower arms 22 of each pair project radially outwards with respect to the longitudinal axis of the corresponding shaft 2 and taper towards their free outermost ends (see FIG. 4). A pivot pin 23 which is in parallel relationship with the corresponding shaft 2 interconnects the free outer ends of each pair of arms 22 and actually projects upwardly above the upper arm 22 and downwardly beneath the lower arm 22 (see FIG. 5). The hub of a corresponding drive pawl 24 surrounds each pivot pin 23 between the corresponding upper and lower arms 22. The upper and lower limbs of a forked bracket 25 are turnably connected to each pivot pin 23 at locations above and beneath the respective upper and lower arms 22, said bracket limbs being in parallel relationship with said arms 22 and the upright bases of the two forked brackets 25 that correspond to the two shafts 2 being fastened to the ends of respective connectors 26 and 27 (FIGS. 3 and 4). The hub of each drive pawl 24 is provided, at substantially the side thereof which is remote from the corresponding shaft 2, with a hook 28 and a tension spring 29 is stretched between that hook and a corresponding anchorage pin 30 which is secured to the base of the associated forked bracket 25 at a location which is substantially midway between both the upper and lower ends of that base and the opposite upright edges thereof. The springs 29 are arranged to urge the drive pawl 24 constantly into engagement with the teeth of the corresponding ratchet wheels 19. FIG. 6 of the drawings shows a somewhat similar arrangement, that will hereinafter be described, in respect of the drive transmission to each shaft 3 and it will be seen from that Figure that the lower end of each pivot pin 23 carries a radially projecting plate 31 which lies immediately beneath the lower surface of the lower limb of the corresponding forked bracket 25. An upright bolt 32 connects each plate 31 to the lower limb of the corresponding bracket 25 and thus guards against accidental axial disengagement of the pin 23 concerned from its appointed position. The parts 31 and 32 are provided in the drive transmission to the shafts 2 but are not visible in FIGS. 4 and 5 of the drawings. The ratchet wheels 19 are prevented from becoming upwardly detached from the corresponding shafts 2, together with the respective upper arms 22, by retaining washers 33 that are mounted on short screwthreaded upper end parts of the shafts 2 together with retaining nuts 34 which nuts may conveniently be identical to the previously mentioned nuts 14.

The ends of the connectors 26 and 27 that are remote from the corresponding forked brackets 25 are connected to an outer ring 35 of a lower eccentric mechanism 38 which mechanism 38 also comprises, inside the ring 35, a ball bearing 36 and an eccentric disc 37. The eccentric disc 37 has an eccentric bore which is internally splined for cooperation with the external splines of a substantially vertical rotary shaft 39 that is located midway between the two shafts 2 and midway between the front and rear walls of the hollow frame portion 1 with respect to the direction A. It will therefore be appreciated that, during operation, the disc 37 rotates with the shaft 39, while the surrounding ring 35 does not rotate but is compelled to move orbitally around said shaft 39. An imaginary substantially vertical plane which contains the longitudinal axes of all four of the shafts 2 and 3 also contains the longitudinal axis of the parallel shaft 39 and the relatively perpendicular longitudinal axis of the hollow frame portion 1 itself. The lower end of the shaft 39 is rotatably supported in a bearing housing 40 (FIG. 3) which bearing housing is releasably fastened to the bottom of the hollow frame portion 1 by bolts that are not visible in the drawings. It can be seen in FIG. 4 of the drawings that the connector 26 is welded or otherwise rigidly secured to the ring 35 of the eccentric mechanism 38 whereas the connector 27 is pivotally coupled to said ring 35 by a pin 41 that extends parallel to the shafts 2, 3 and 39, the pin 41 co-operating with a pair of lugs 42 which project outwardly from the curved surface of ring 35. As seen in FIG. 4 of the drawings, the radially extending (with respect to the center of the ring 35) longitudinal axis of the connector 26 is inclined to a line which interconnects the midpoint of the ring 35 and the longitudinal axis of the pivot pin 41 by an angle of substantially 150°, both the longitudinal axis of the connector 26 and the line which has just been mentioned being inclined rearwardly from the center of the ring 35 with respect to the direction A.

A second upper eccentric mechanism 43 that also comprises an inner eccentric disc 37, an outer ring 35 and an intervening ball bearing 36 is arranged above the lower eccentric mechanism 38 on the same rotary shaft 39 as that mechanism 38. However, as will be evident from FIG. 4 of the drawings, the disc 37 of the upper eccentric mechanism 43 is turned angularly through substantially 180° about the longitudinal axis of the shaft 39 as compared with the disc 37 of the lower mechanism 38, having regard to the eccentricities of the two discs 37. Thus, apart from the angular positions of the respective discs 37 about the axis of the shaft 39, the two eccentric mechanisms 38 and 43 are substantially identical. The outer curved surface of the ring 35 of the upper eccentric mechanism 43 has lugs 44 and 45 welded or otherwise rigidly secured to it at two locations which are spaced apart from one another around the center of said ring 35. As seen in FIG. 4 of the drawings, the longitudinal axes of the lugs 44 and 45 both extend radially with respect to the center of the ring 35 and are inclined to one another at that center by substantially 165°. Both the longitudinal axes that have just been mentioned are inclined forwardly, with respect to the direction A, from the center of the ring 35 of the upper eccentric mechanism 43. A pivot pin 46 which is parallel to the shafts 2, 3 and 39 turnably connects the lug 44 to the limbs of a fork 47 whose base is welded or otherwise rigidly secured to one end of a connector that is in the form of a tubular connecting rod 48. The lug 45, which is in two parts, is, on the other hand, rigidly secured to one end of a tubular connector 49 that extends radially with respect to the centre of the ring 35 of the upper eccentric mechanism 43. The tubular connecting rod 48 and the tubular connector 49 both pass in front of corresponding ones of the two shafts 2, with respect to the direction A, and the opposite ends thereof and drivingly connected to the two longer shafts 3, and thus to the corresponding soil working members 4, in substantially the same way as has already been described for the drive transmission to the shafts 2 with particular reference to FIGS. 4 and 5 of the drawings. The drive to one of the two longer shafts 3 is shown in FIGS. 6 and 7 of the drawings and parts which appear in those Figures, and that are very similar, or identical, to parts which have already been described, are indicated by the same reference numerals as have been used above and as appear in FIGS. 4 and 5, in particular, of the drawings.

Each of the four ratchet wheels 19 is provided, in addition to the drive pawl 24, with a corresponding non-return pawl 50. Each non-return pawl 50 has a hub which is turnable about a corresponding substantially vertical pivot pin 51 that is supported between the broad substantially horizontally extending upper and lower limbs of a corresponding bracket 52 whose upright base is firmly but releasably secured to one of the upright walls of the hollow frame portion 1 by substantially horizontally disposed bolts 53. The brackets 52 which correspond to the shafts 2 are secured to the front upright wall of the hollow frame portion 1 whereas the brackets 52 which correspond to the two shafts 3 are secured to the rear upright wall of that frame portion. The hub of each non-return pawl 50 carries a hook 54 and a tension spring 55 is stretched between said hook and an upright anchorage pin 54A that interconnects the limbs of the bracket 52 concerned. The springs 55 urge the non-return pawls 50 constantly into engagement with the teeth of the corresponding ratchet wheels 19.

The upper end of the rotary shaft 39 is rotatably supported, at a level above that of the upper eccentric mechanism 43, in a bearing which is carried by a housing 56 (FIG. 3), said bearing housing 56 being secured to a detachably mounted central cover plate 57 of the hollow frame portion 1. The central cover plate 57 is flanked at both sides by corresponding lateral cover plates 58 (FIGS. 1, 3, 6 and 7) which plates 58 are also removable, when required, to gain access to the parts which are located beneath them. It is noted that the central cover plate 57 has been removed in the view of FIG. 5 of the drawings. The rotary shaft 39 extends upwardly through an opening in the central cover plate 57 into a gear box 59 that is releasably fastened by bolts to the top of the central cover plate 57. The shaft 39 extends some distance upwardly through the gear box 59 and through a top wall of that gear box into an overlying change-speed gear 65. A second shaft 62 which is in substantially vertically parallel relationship with the shaft 39 is spaced from that shaft 39 inside an upper region of the gear box 59 and its upper end, like that of the shaft 39, projects through the top wall of the gear box 59 and into the change-speed gear 65. The upper ends of the two shafts 39 and 62 that project into the casing of the change-speed gear 65 are both splined and are arranged to co-operate with the matchingly splined hubs of pairs of straight-toothed or spur-toothed pinions such as the pinions 60 and 61 which are illustrated diagrammatically in FIG. 3 of the drawings. Preferably, at least two pairs of co-operating pinions of different sizes are provided for use with the change-speed gear 65, the two pinions in each pair being interchangeable in position on the shafts 39 and 62 and one pair of pinions, such as the pair 60 and 61, being exchangeable for at least one other co-operating pair whose pinions are of different sizes. It will be realised that the particular pair of pinions which is used in the change-speed gear 65, and the arrangement thereof that is selected with respect to the shafts 39 and 62 will determine the transmission ratio between said shafts. Access to the interior of the change-speed gear 65 is readily obtained by removing a top cover plate 64 that in maintained in its closing position by a pair of wing nuts 63. The lower end of the shaft 62 which is located inside the gear box 59 carries a bevel pinion 66 whose teeth are in driven mesh with those of a second bevel pinion 67, the latter pinion being secured to a rotary input shaft 68 of the implement. The rotory input shaft 68 extends substantially horizontally parallel to the direction A and has a forwardly projecting splined or otherwise keyed end which is intended to be placed in driven connection with the rear power take-off shaft of an agricultural tractor or other operating vehicle through the intermediary of a telescopic transmission shaft, which is of a construction that is known per se, having universal joints as its opposite ends. Part of such a telescopic transmission shaft is illustrated somewhat diagrammatically in FIGS. 1 and 2 of the drawings.

The opposite ends of the hollow frame portion 1 are closed by substantially vertical side plates 69 which are in parallel relationship with one another and parallel or substantially parallel relationship with the direction A. As can be seen best in FIG. 2 of the drawings, the side plates 69 project both forwardly beyond, and rearwardly behind, the remainder of the hollow frame portion 1 with respect to the direction A. Upper regions of the rearwardly projecting portions of the two side plates 69 are provided with substantially horizontally aligned stub shafts 70 about which corresponding arms 71, that extend generally forwardly with respect to the direction A from those stub shafts, are upwardly and downwardly turnable alongside the respective plates 69. The leading ends of the two arms 71 are provided, at the relatively remote outer sides of the arms, with substantially horizontally aligned axles 72 upon which corresponding pneumatically tyred ground wheels 73 are mounted in a freely rotatable manner. The forwardly projecting portion of each side plate 69 is formed with a curved row of holes 75, the holes 75 being equidistant from the substantially horizontale axis which is defined by the stub shafts 70. Each arm 71 is formed with a hole at the same distance from said axis and the holes in the arms 71 can thus be brought into register with chosen ones of the holes 75 in the corresponding curved rows by turning said arms 71 upwardly or downwardly about their respective stub shafts 70. Bolts 74 (FIG. 1) are provided for entry through the holes in the arms 71 and chosen ones of the holes 75 to retain said arms 71, and thus the ground wheels 73, in corresponding angular positions about the axis which is defined by the stub shafts 70. It will be aparent that the level of the ground wheels 73 which is chosen by the adjustment which has just been described relative to the level of the hollow frame portion 1 is a principal factor for determining the maximum depth of penetration of the tines 15 into the soil which is possible during the operation of the implement.

Two supports 76 which are both of channel-shaped cross-section are arranged on top of the central cover plate 57 of the hollow frame portion 1 so as to extend substantially horizontally parallel to the direction A, said supports 76 being spaced apart from the midpoint of the frame portion 1 by equal distances and actually being disposed in substantially vertical register with corresponding ones of the two shafts 2. The supports 76 both project forwardly with respect to the direction A beyond the leading front wall of the hollow frame portion 1 and each of them has a corresponding upright beam 78 pivotally connected to the forwardly projecting leading end thereof by a corresponding substantially horizontally disposed pivot pin 77. The pivot pins 77 are substantially aligned in a direction which is perpendicular or substantially perpendicular to the direction A. The upright beams 78 form parts of a coupling member or trestle 79 of the implement and have their upper ends interconnected by a substantially horizontal beam (FIG. 3) which is parallel or substantially parallel to the transverse length of the hollow frame portion 1. The coupling member or trestle 79 and the remainder of the implement are turnable relative to one another about the axis which is defined by the pivot pins 77 which axis is located at substantially the level of the top of the hollow frame portion 1 at a location just in advance of that frame portion and inwardly towards the center of the implement from the lower coupling points of the member or trestle 79. The upright beams 78 have their lowermost ends at a level which is just above that of the bottom of the hollow frame portion 1, said lowermost ends being rigidly interconnected by a transverse beam 80 and being provided, immediately above the beam 80, with corresponding outwardly projecting substantially horizontally aligned pins 81 which pins afford lower coupling points of the member or trestle 79 that has been discussed above. The top of the beam which interconnects the upper ends of the beams 78 is provided, midway between the opposite ends of the beam, with a pair of upright lugs which afford the third coupling point of the member or trestle 79 and that are intended for use in the manner which is illustrated somewhat diagrammatically in FIGS. 1 and 2 of the drawings. The bottom of the lower transverse beam 80 is provided, midway along the length of that beam, with a rearwardly projecting bracket 82 whose rear end is connected by a substantially vertically disposed shear pin 83 to the forwardly projecting limbs of a fork 84 that is fastened to the front wall of the hollow frame portion 1, said bracket 82 being entered between the upper and lower limbs of the fork 84.

In the use of the soil cultivating implement that has been described, its coupling member or trestle 79 is connected to the three-point lifting device or hitch at the rear of an agricultural tractor or other operating vehicle in the manner that has been briefly described above and that is illustrated somewhat diagrammatically in FIGS. 1 and 2 of the drawings. The forwardly projecting end of the rotary input shaft 68 is placed in driven connection with the rear power take-off shaft of the same tractor or other operating vehicle through the intermediary of the known telescopic transmission shaft that has universal joints at its opposite ends. Adjustments that may, if necessary, be made before work commences include setting the maximum depth to which the tines 15 of the coil working members 4 will be able to penetrate into the soil by bodily displacing the ground wheels 73 upwardly or downwardly, as may be required, about the axis which is defined by the stub shafts 70, employing the bolts 74 to maintain any newly chosen setting. The speed at which the soil working members 4 will revolve in response to a substantially constant speed of rotation that is applied to the rotary input shaft 68 can be increased or decreased, as may be desired, by re-arranging the pinions 60 and 61 in the change-speed gear 65 or substituting an alternative pair of co-operating pinions (not shown) for the pinions 60 and 61. These adjustments will usually be made having regard to the nature and condition of the soil that is to be dealt with and the particular purpose for which that soil is required after cultivation. As the implement moves forwardly in the direction A over land that is to be cultivated, usually to a considerable depth, the soil working members 4 will be intermittently rotated in a step-by-step manner by the drive transmission to them which comprises the pawls 24, the ratchet wheels 19 and the eccentric mechanisms 38 and 43. The transmission is so arranged that each member 4 revolves in the opposite direction to its immediately neighbour, or to both of its immediate neighbours, the directions of rotation of the four members 4 being indicated by arrows in FIGS. 1 and 4 of the drawings. With this arrangement, the two members 4 that are at one side of the center of the hollow frame portion 1 both rotate in opposite directions as do the two members 4 that are at the opposite side of said midpoint. The strips of land which are worked by the individual members 4 do not actually overlap one another but, as will be apparent from the drawings, are so closely adjacent to one another that, in effect, the implement works a single broad strip of soil which, with the dimensions that have been referred to above, will have a width of substantially 3 meters.

When soil cultivating implements, such as rotary harrows, are used for deep cultivation work and have soil working members which are driven continuously at high speed, a very high resistance to the progress of their tines or other soil working tools through the earth is encountered and this can lead to frequent failures of the drive transmission to the soil working members unless a very robust drive transmission is employed. If such soil cultivating implements are provided with bladed or knife-edged soil working tools, the continuous rotation of such members at high speed can produce a most disadvantageous puddling effect upon some soils, particularly heavy soils that are in a wet condition. The intermittent drive to the bladed soil working members 4 of the implement that has been discribed has been found very greatly to reduce, if not entirely eliminate, the disadvantageous puddling effect that has just been referred to even when performing the deep cultivation of heavy soil that is in a wet condition. Moreover, any buried stones or other hard obstacles that may possibly get caught between the tines 15 of immediately neighbouring members 4 will, due to the intermittent rotation, almost always be released without causing damage. It will also be remembered that the carriers or supports 13 of the tines 15 are of resilient formation as are the tines 15 themselves so that resilient deflection of any obstructed tine 15 can readily take place. The intermittent step-by-step rotation of the members 4 causes the tines 15 to move in such a way as to cause intensive loosening of the soil, a continuous vibration effect being produced which tends to make the soil break up along natural lines of fracture such as are produced by plant roots, worm holes and the like. Such crumbling of the soil takes place with very little, if any, smearing and puddling thereof. It has already been mentioned that the change-speed gear 65 allows the members 4 to be intermittently rotated at greater or lesser speeds in response to a substantially constant applied speed of rotation and it is noted that the transmission parts which include the drive pawls 24 and the ratchet wheels 19 are so dimensioned, in the example which is being described, that a speed reduction in the ratio of 10:1 is produced between the rotary shaft 39 and each of the four shafts 2 and 3. The diametrically opposed relationship of the discs 37 of the two eccentric mechanisms 38 and 43 around the axis of the shaft 39 ensures that forces which are produced and that tend to cause lateral displacement of the implement in one direction are substantially constantly balanced by forces tending to produce lateral displacement in the opposite direction and, accordingly, the implement operates quite quickly and without undue vibration.

The non-return pawls 50 substantially completely prevent any rotation of the members 4 in the wrong directions, the drive transmission which comprises the pawl and ratchet mechanisms, the eccentric mechanisms and the connectors that extend therebetween being supported in a very effective manner by the frame portion 1. The hollow interior of the frame portion 1 is partially filled with oil or other liquid lubricant during the operation of the implement so that the transmission parts which have just been mentioned are either constantly or intermittently immersed in the oil or other lubricant or are at least frequently splash-lubricated thereby. If a firmly embedded obstacle should be met with by one or more of the soil working members 4 during the operation of the implement, the resistance to forward movement in the direction A will rapidly rise and, if the obstacle cannot be avoided or displaced, the shear pin 83 will break and the frame portion 1 and the parts which it carries will turn upwardly in an anti-clockwise direction, as seen in FIG. 2 of the drawings, about the axis which is defined by the pivot pins 77 thus ensuring that serious damage or breakage will not occur. The shear pin 83 can, of course, readily and inexpensively be replaced after action has been taken to avoid or move the embedded obstacle.

Although certain features of the soil cultivating implement that has been described and/or that is illustrated in the accompanying drawings will be set forth in the following claims as inventive features, it is emphasised that the invention is not necessarily limited to those features and that it includes whitin its scope each of the parts of the soil cultivating implement that has been described, and/or that is illustrated in the accompanying drawings, both individually and in various combinations.

What we claim is:

1. A soil working implement comprising a frame and a plurality of soil working members being supported on the frame, said members each being rotatable about respective shafts and a transmission having intermittent drives connected to periodically rotate said shafts, said transmission comprising a common rotary input shaft and reciprocable drive connectors extending to each side of eccentric mechanisms mounted on said input shaft, one above the other, the respective shaft of each working member mounting a ratchet wheel and a drive pawl that interconnects one of the connectors to said ratchet wheel, a non-return pawl being pivotally mounted adjacent said wheel to prevent rotation of said shaft in one direction.

2. An implement as claimed in claim 1, wherein said members are mounted in a row on an elongated portion of the frame and the non-return pawl is supported by an upwardly extending wall of said frame portion.

3. An implement as claimed in claim 2, wherein the transmission comprises a change-speed gear that interconnects a driving shaft to said input shaft.

4. An implement as claimed in claim 3, wherein said change-speed gear is located at the top of a gear box mounted on the frame portion.

5. An implement as claimed in claim 4, wherein said change-speed gear comprises a chamber which accomodates interchangeable toothed pinions of different sizes and an access top is fitted on said chamber.

6. An implement as claimed in claim 4, wherein adjacent soil working members are driven in relative opposite directions.

7. A soil working implement comprising a frame and a plurality of soil working members supported on said frame, said members each being rotatable about respective upwardly extending shafts and a transmission having respective intermittent drives connected to periodically rotate said shafts, said transmission comprising a common rotary input shaft and reciprocable eccentric drive connectors drivingly connected to the respective upwardly extending shafts, at least one eccentric mechanism on said input shaft and said mechanism connected to corresponding eccentric drive connectors, said connectors comprising drive pawls and ratchet wheels on at least two of said shafts, said mechanism being fastened to a first connector that rotates one member located at one side of said input shaft, said mechanism also being coupled to a second connector that transmits drive to a further member located at the opposite side of said input shaft.

8. An implement as claimed in claim 7, wherein said mechanism includes two eccentric rotary discs with surrounding, relatively rotatable rings, each ring being fastened to a respective first connector that rotates a corresponding member at one side of the input shaft and a respective second connector that rotates a respective further member at the opposite side of said input shaft.

9. An implement as claimed in claim 8, wherein said drives include corresponding drive pawls and ratchet wheels for each of said shafts.

10. An implement as claimed in claim 9, wherein the ratchet wheel of each member can revolve in only one direction.

11. An implement as claimed in claim 10, wherein said members are mounted along the length of an elongated portion of said frame and the input shaft is located centrally of the frame portion, said discs being mounted on the input shaft.

12. An implement as claimed in claim 11, wherein there are two eccentric discs mounted on said input shaft and said mechanisms are 180° out of register with one another about the axis of that shaft as regards their eccentricities.

13. An implement as claimed in claim 12, wherein said input shaft extends substantially parallel to the axes of rotation of said members.

14. An implement as claimed in claim 11, wherein said respective shafts are rotatably supported in said frame portion of the implement and said portion houses part of said transmission.

15. An implement as claimed in claim 14, wherein said respective shafts are rotatably supported in bearings in housing fastened to a strengthening plate on the bottom of said frame portion.

16. An implement as claimed in claim 9, wherein the ratchet wheels that correspond to said members are located adjacent the upper ends of the respective shafts and respective arms interconnect the connections to those shafts.

17. A soil working implement comprising a frame and a plurality of soil working members being supported on the frame, said members each being rotatable about a respective upwardly extending shaft, a transmission having intermittent drives connected to periodically rotate said shafts and comprising a common rotary input shaft and reciprocable eccentric drive connectors drivingly connected to the respective upwardly extending shafts, said connectors being arranged to transmit drive to an inner two soil working members, said connectors being located at a lower horizontal level than longer connectors arranged to transmit drive to an outer two soil working members of said row, said longer connectors being normally positioned in advance of said shafts of said soil working members with respect to the direction of travel.

* * * * *